P. BARNUM.
TIRE CARRIER.
APPLICATION FILED JUNE 2, 1919.

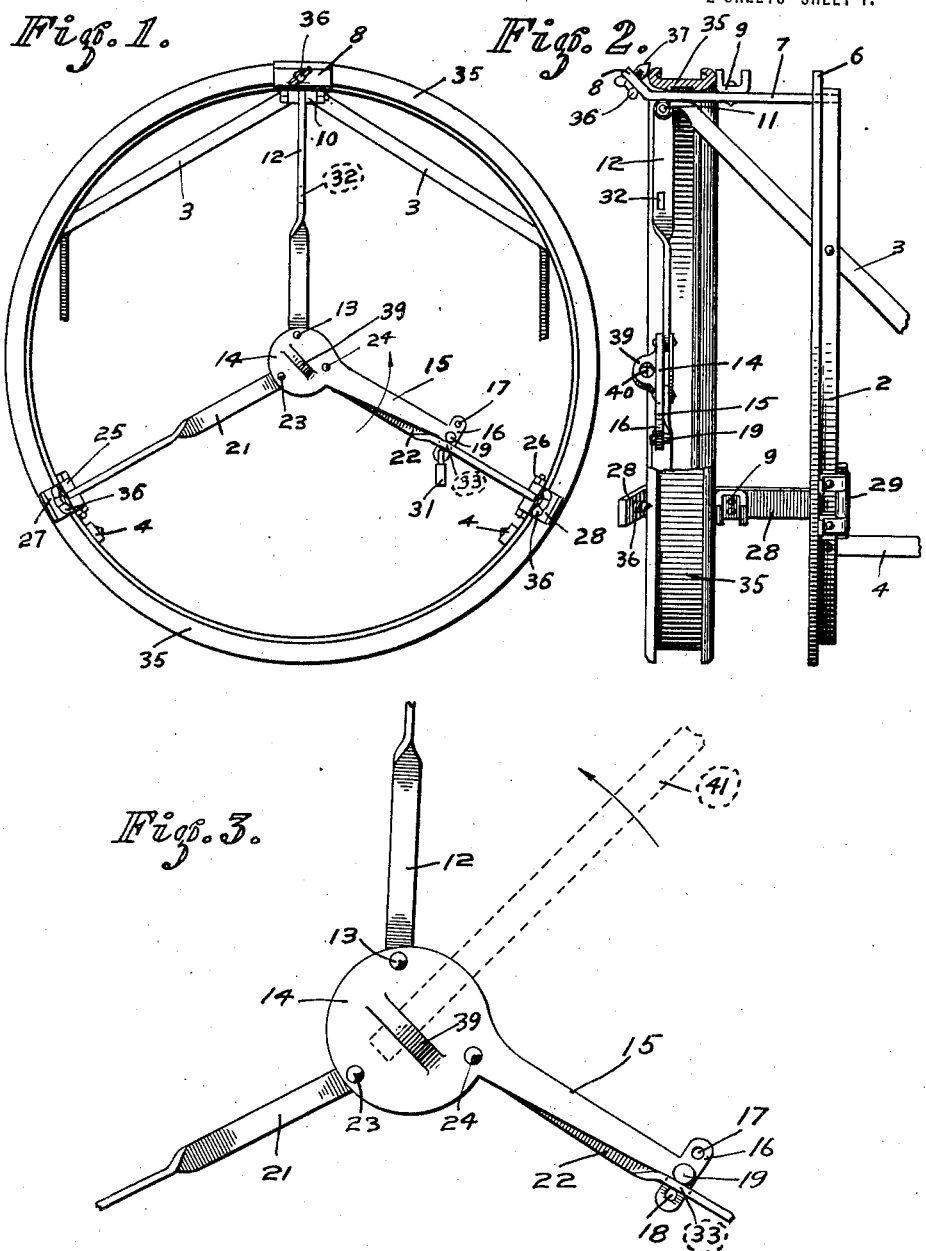

1,340,431.

Patented May 18, 1920.
2 SHEETS—SHEET 2.

WITNESS
Bradley L. Benson

INVENTOR
PAUL BARNUM
BY
Baldwin Vale
ATTORNEY

UNITED STATES PATENT OFFICE.

PAUL BARNUM, OF SAN FRANCISCO, CALIFORNIA.

TIRE-CARRIER.

1,340,431.  Specification of Letters Patent.  Patented May 18, 1920.

Application filed June 2, 1919. Serial No. 301,337.

*To all whom it may concern:*

Be it known that I, PAUL BARNUM, a citizen of the United States, and a resident of the city and county of San Francisco, State of California, have made a new and useful invention—to wit, Improvements in Tire-Carriers; and I do hereby declare the following to be a full, clear, concise, and exact description of the same.

This invention relates to a new and useful improvement in tire carriers of the type usually attached to the rear of a car.

The principal object of this invention is to provide a carrier which will conveniently carry one or more tires preferably mounted on rims and irrespective of the size of the rim within certain limits.

Another object is to provide a carrier which is automatic in clamping, and which will hold the rims against theft.

A further object is to provide a rim carrier which is simple in operation, and which will hold the rims firm enough to prevent any rattling during travel.

Another object and a distinct advantage of this invention is that the tire carrier herein described may be fixed to a wall, as in a garage, and used for mounting or demounting tires carried by collapsible rims. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying drawings,

Figure 1 is an elevation of my improved tire carrier as it appears from the rear of an automobile to which it is attached.

Fig. 2 is a side elevation of Fig. 1 partly broken away.

Fig. 3 is a plan view of the operating links of my tire holder.

Figure 4:
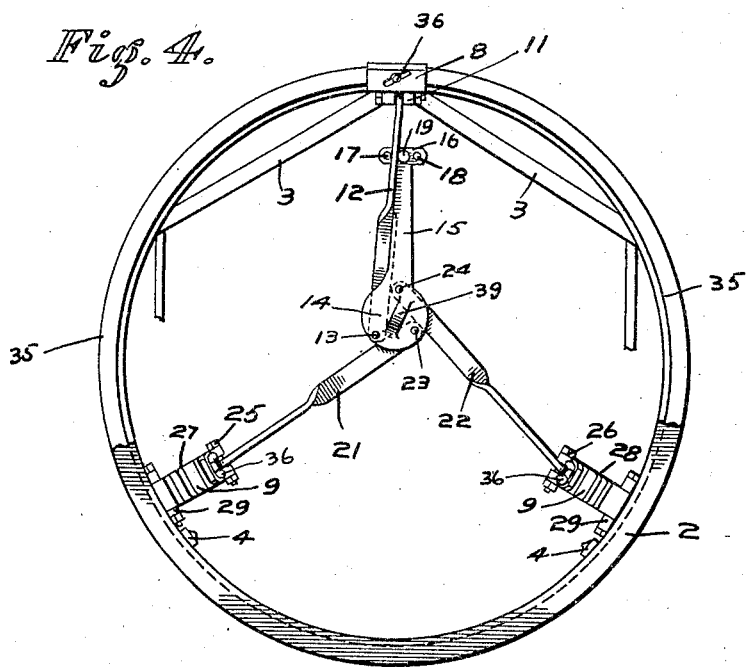
Fig. 4 is a view similar to Fig. 1, with the links of my carrier in retracted position.
Figure 5:
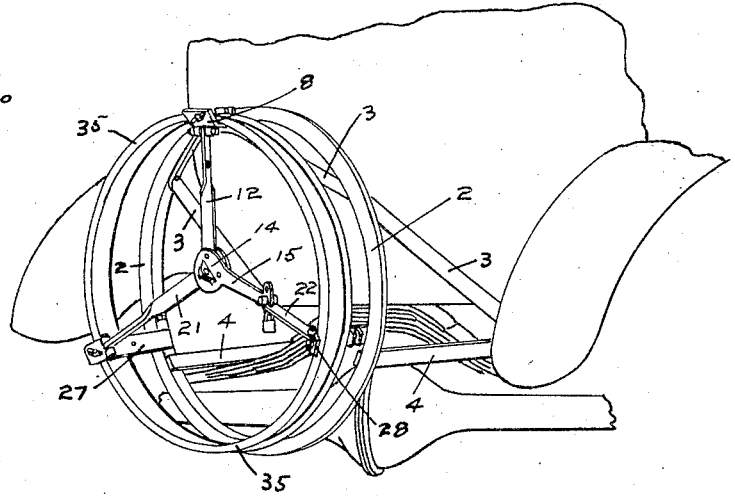
Fig. 5 is a perspective view of my improved carrier attached to the rear of an automobile.

In the several views of the drawings, like numerals correspond to like parts. The numeral 2 refers to a circular frame of substantially the same size as the rims or tires which are to be carried. This ring 2 is supported upon the car by diagonal braces 3 and horizontal braces 4. This ring 2 is preferably made of angle iron, and has an upstanding flange 6. At the uppermost point of ring 2 I rivet, or in any other manner attach, a support 7 which is a laterally projecting strip of metal having an upturned end 8. This strip is of sufficient length to accommodate one or more rims in parallel position. If more than one rim is used, a spacer 9 is attached to the member 7 for obvious reasons. The diagonal braces 3 are continued so as to meet at the point 10 and to form an additional support for the member 7. Hinged at the point 11 is a depending link 12. This link is bent at right angles to itself at substantially midway of its length, the purpose of which will be hereinafter explained. The lower end of this link 12 is pivoted at 13 to a circular member 14. This circular member 14 has a handle 15 provided at its outward end with a T-head 16 having openings 17 and 18 therein. A stop 19 is also provided upon said T-head and is adapted to limit the movement of said handle as will be hereinafter explained. Near the lower periphery of the circular member 14, I pivot links 21 and 22. The pivot points 23 and 24 of these links are substantially 120 degrees removed from the pivot point 13 of the link 12. These links are similar in construction to the link 12, in that they are bent at a point substantially midway of their length. The free ends of these links 21 and 22 are hingedly connected at 25 and 26 to lateral metal strips 27 and 28. These metal strips are identical in construction with the member 7 with the exception that they are hinged at their rear ends as shown in Figs. 2 and 4 at 29.

When the parts are in the position shown in Fig. 1, a padlock 31 may be inserted through the opening 18. This will result in the device being locked in this position. When the parts are in the position shown in Fig. 4, the padlock may be placed through the opening 17 and the parts will then be locked open. In order to accomplish this locking, I have provided openings 32 and 33 in the members 12 and 22 respectively, to accommodate either end of the T-head 16.

The operation of my device is as follows:—Assuming that it is desired to place tires or rims as at 35 upon my carrier, the handle 15 is swung from the position shown in Fig. 1 to the position shown in Fig. 4. It is obvious that if the device is locked, the padlock must be removed. When swung into the position shown in Fig. 4, the members 27 and 28 are drawn upwardly and consequently a tire or rim may be placed upon the member 7, so that it will hang parallel to the metal ring 2 and as many tires may be hung upon the member 7 as accommodation permits.

If only one tire or rim is to be carried, it may be placed close to the ring 2 or at the outer end of the member 7. The handle 15 is then swung to the position shown in Fig. 1, so that part of the T-head will pass through the opening 33 in the link 22 and the stop 19 will come in contact with said link. This will cause the expansion of the members 27 and 28 which will engage the inner periphery of the tire or rim being placed upon the carrier.

Should the extension be slightly greater than the inside of the tire, the links 12, 21 and 22 will bend slightly owing to their twisted form, thereby allowing the handle 15 to be pulled to its full limit, and at the same time exerting an expansive force against the inside of the device being held. This expansive force in three different directions maintains the rim or tire and prevents warping of the same, which is not true of carriers where pressure is brought to bear at two opposite points, or substantially opposite points.

It will be noted from Fig. 3 that the pivot points 13, 23 and 24 are slightly offset from a line drawn through the center of the member 14 and the centers of links 12, 21 and 22.

Figure 6:
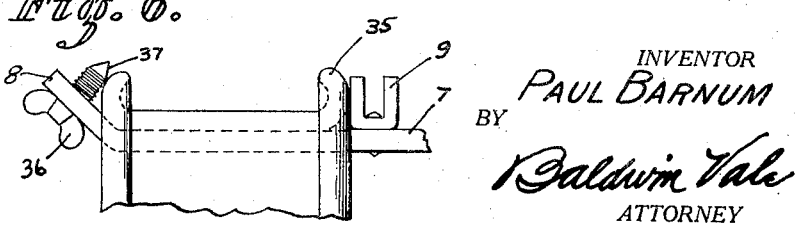
Fig. 6 is a detail view of a rim collapsing means.

In Fig. 6 I have shown a fragment of the rim 35 on a larger scale than that of the other figures. Through the upturned end 8 of the member 7 I tap a hole to receive a threaded wing bolt 36 having a conical end 37 adapted to engage the rim annulus as the wing bolt is turned.

The members 27 and 28 are provided with wing bolts exactly like the bolt 37 which may extend obliquely through said members or the said members may be upturned in a manner similar to the member 7.

The purpose of this construction is to provide a means for collapsing that type of collapsible rims which are made in sections and have hinged members to allow the contraction of the rim to remove a tire therefrom. Obviously with this device it is possible to hold a collapsible rim at one point, as, for instance, where the rim contacts with member 7, and collapse said rim as the members 27 and 28 are drawn inwardly by the rotation of the handle 15. In order to afford an additional leverage for turning the handle 15, I have provided a lug 39 integral with the circular member 14. This lug is provided with an eye 40, Fig. 2, adapted to engage a bar or lever 41 shown in dotted lines in Fig. 3.

Having thus described my invention, what I claim and desire to secure by Letters Patent of the United States is:—

1. In a tire carrier, the combination of a ring, supports for said ring, said supports being attached to a car, a laterally projecting member near the top of said ring, the outer end of said lateral member being supported by said supports, hinged lateral members substantially one hundred and twenty degrees removed from said upper lateral member, a circular member equidistant from said lateral members, links pivoted to said lateral members and to said circular member, said links being bent substantially midway of their length, a handle integral with said circular member, said handle having a T-shaped head adapted to engage openings in either of two of said links, a stop carried by said T-head, and means for locking said handle in a fixed position.

2. In a tire carrier, the combination of a ring, supports for said ring, said supports being attached to a car, a laterally projecting member near the top of said ring, the outer end of said lateral member being supported by said supports, hinged lateral members substantially one hundred and twenty degrees removed from said upper lateral member, a circular member equidistant from said lateral members, links pivoted to said lateral members and to said circular member, the said last mentioned points of pivotal connection being off center, said links being bent substantially midway of their length, a handle integral with said circular member, said handle having a T-shaped head adapted to engage openings in either of two of said links, a stop carried by said T-head, and means for locking said handle in an operative or inoperative position.

3. In a tire carrier, the combination of a ring, diagonal supports for said ring, said supports being attached to a car, a laterally projecting member near the top of said ring, the outer end of said lateral member being supported by said diagonal supports, hinged lateral members substantially one hundred and twenty degrees removed from said upper lateral member, a circular member equidistant from said lateral members, links pivoted to said lateral members and to said circular member, the said last mentioned points of pivotal connection being off center, said links being bent substantially midway of their length, a handle integral with said circular member, said handle having a T-shaped head adapted to engage openings in either of two of said links, a stop carried by said T-head, means for locking said handle in an operative or inoperative position, and screw threaded rim engaging members carried by said lateral members.

In testimony whereof, I have hereunto set my hand at San Francisco, Cal., this 28th day of April, 1919.

PAUL BARNUM.

In presence of—
A. J. HENRY.